United States Patent [19]

Morris

[11] Patent Number: 5,239,020
[45] Date of Patent: Aug. 24, 1993

[54] POLYESTER/POLYCARBONATE BLENDS

[75] Inventor: John C. Morris, Kingsport, Tenn.

[73] Assignee: Eastman Kodak Company, Rochester, N.Y.

[21] Appl. No.: 794,302

[22] Filed: Nov. 14, 1991

Related U.S. Application Data

[63] Continuation of Ser. No. 566,586, Aug. 13, 1990, abandoned, which is a continuation of Ser. No. 75,287, Jul. 20, 1987, abandoned, which is a continuation of Ser. No. 940,192, Dec. 10, 1986, abandoned, which is a continuation of Ser. No. 768,075, Aug. 21, 1985, abandoned.

[51] Int. Cl.$^5$ ............... C08L 67/02; C08L 69/00
[52] U.S. Cl. .................................. 525/439; 525/466
[58] Field of Search ........................................ 525/439

[56] References Cited

U.S. PATENT DOCUMENTS

| | | | |
|---|---|---|---|
| 2,720,507 | 10/1911 | Caldwell | 524/603 |
| 3,218,372 | 11/1965 | Okamura | 525/439 |
| 3,953,539 | 4/1976 | Kawase et al. | 260/860 |
| 4,088,709 | 5/1978 | Seymour et al. | 260/860 |
| 4,125,572 | 11/1978 | Scott | 260/860 |
| 4,391,954 | 7/1983 | Scott | 525/439 |
| 4,452,933 | 6/1984 | McCready | 524/217 |
| 4,786,692 | 11/1988 | Allen et al. | 525/439 |

Primary Examiner—Patricia A. Short
Attorney, Agent, or Firm—John F. Stevens; William P. Heath, Jr.

[57] ABSTRACT

Disclosed is a composition of matter comprising a homogeneous blend of polyester and a polycarbonate of 4,4-isopropylidenediphenol, the composition having a Gardner b value of less than 10 and a Gardner a value of less than 4. The polyester is produced using an organic derivative of tin as catalyst.

6 Claims, No Drawings

POLYESTER/POLYCARBONATE BLENDS

This is a continuation of copending application Ser. No. 07/566,586 filed on Aug. 13, 1990, now abandoned, which is a continuation of Ser. No. 07/075,287 filed on Jul. 20, 1987, now abandoned which is a continuation of Ser. No. 06/940,192 filed on Dec. 10, 1986, now abandoned, which is a continuation of Ser. No. 06/768,075 filed on Aug. 21, 1985, now abandoned.

TECHNICAL FIELD

This invention relates to polyester/polycarbonate blends having improved color. The desirable color improvement is achieved by preparing polyesters with a tin catalyst which is essentially free of titanium.

BACKGROUND OF THE INVENTION

It is well known that the utility of a commercial molding plastic is influenced by its color and clarity. The commercial polycarbonates disclosed in polyester/polycarbonate blends of the prior art are essentially colorless or only slightly yellow with a Gardner b color value less than 5. Essentially all the polyesters based on 1,4-cyclohexanedimethanol described in the prior art, or such as those described specifically in U.S. Pat. No. 2,901,466, are prepared using a catalyst system based on titanium. For example, sodium hydrogen hexabutyl titanate, acetyl triisopropyl titanate, tetraisopropyl titanate, and tetrabutyl titanate are some of the more common catalyst systems used to prepare these polyesters. The commercial polyesters based on 1,4-cyclohexanedimethanol, like the polycarbonates, have excellent clarity and color when prepared with a titanium catalyst. However, the blends of clear, colorless Lexan 101 polycarbonate or Merlon M-40 polycarbonate and clear, colorless Kodar A150 polyester are reddish-orange in color, having a Gardner b color value greater than 20.

The polyesters which are disclosed in the polyester/polycarbonate blend art are described more completely in U.S. Pat. No. 2,901,466. U.S. Pat. No. 2,720,507 discloses the use of organotin compounds useful as polyester polymerization catalysts.

Blends of polyester prepared with tin catalysts and bisphenol A polycarbonate are not believed to be disclosed or suggested in the art. The prior art does not disclose or describe the color of polymer blends prepared using various catalyst systems.

U.S. Pat. No. 4,391,954 discloses blends of bisphenol A polycarbonate and the polyester consisting of units of terephthalic acid, isophthalic acid, and 1,4-cyclohexanedimethanol.

U.S. Pat. No. 4,088,709 discloses blends of bisphenol A polycarbonate and poly(tetramethylene terephthalate) containing a phosphorus stabilizer. U.S. Pat. No. 4,125,572 discloses compatible blends of bisphenol A polycarbonate with polyester and U.S. Pat. No. 4,452,933 discloses a process for stabilizing blends of bisphenol A polycarbonate and polyesters.

DESCRIPTION OF THE INVENTION

According to the present invention, there is provided a composition of matter comprising a homogeneous blend of
(a) about 5–95% by weight of a polyester having repeating units from at least one aromatic, aliphatic or alicyclic dicarboxylic acid having 3–20 carbon atoms and repeating units from at least one aliphatic glycol having 3–20 carbon atoms, and
(b) about 95–5% by weight of a polycarbonate of 4,4-isopropylidenediphenol (bisphenol A),
the composition having a Gardner b value of about 10 to about −1 (preferably about 6 to about −1) and a Gardner a value of about 4 to about −4 (preferably about 2 to about −3).

The polyester described above is the reaction product of the dicarboxylic acid and the glycol produced in the presence of a catalyst comprising a tin compound, normally in the form of an organic derivative of tin, and essentially in the absence of titanium or compound of titanium. The tin is present at from about 50 to about 700 ppm (parts per million) expressed as elemental tin, based on the polyester weight.

The dicarboxylic acid portion of the polyesters useful in this invention may contain 3 to 20 carbon atoms and may consist of units of aromatic, aliphatic, or alicyclic dicarboxylic acids or combinations of these dicarboxylic acids. Examples of useful aliphatic dicarboxylic acids are malonic, succinic, glutaric, adipic, pimelic, suberic, azelaic, sebacic, dodecanedioic, 1,4-, 1,5-, and 2,6-decahydronaphthalenedicarboxylic acid, and cis-or trans-1,4-cyclohexanedicarboxylic acid. Examples of useful aromatic dicarboxylic acids are terephthalic, isophthalic, 4,4'-biphenyldicarboxylic acid, trans 3,3'- and trans-4,4'-stilbenedicarboxylic acid, 4,4'-dibenzyldicarboxylic acid, 1,4-, 1,5-, 2,3-, 2,6-, and 2,7-naphthalenedicarboxylic acid. The preferred dicarboxylic acids are terephthalic and isophthalic, or blends thereof.

The glycol portion of the polyesters useful in this invention may consist of aliphatic glycols containing 3 to 20 carbon atoms. Examples of useful glycols are 1,2-propylene glycol, 1,3-propanediol, 1,4-butanediol, 1,5-pentanediol, 1,6-hexanediol, 1,2-, 1,3-, and 1,4-cyclohexanedimethanol, and 1,4-, 1,5-, or 2,6-decahydronaphthalenedimethanol. The preferred glycol is 1,4-cyclohexanedimethanol.

Tin catalysts for preparing the polyester of this invention are known in the art. For example, see U.S. Pat. No. 2,720,507, which is incorporated herein by reference. In this patent, it is disclosed that certain compounds are especially valuable for use as catalytic condensing agents in the preparation of high melting linear polyesters. These catalysts are tin compounds containing at least one organic radical. These catalysts include compounds of both divalent or tetravalent tin which have the general formulas set forth below:

A. $M_2(Sn(OR)_4)$
B. $MH(Sn(OR)_4)$
C. $M'(Sn(OR)_4)$
D. $M'(HSn(OR)_4)_2$
E. $M_2(Sn(OR)_6)$
F. $MH(Sn(OR)_6)$
G. $M'(Sn(OR)_6)$
H. $M'(HSn(OR)_6)_2$
I. $Sn(OR)_2$
J. $Sn(OR)_4$
K. $SnR'_2$
L. $SnR'_4$
M. $R'_2SnO$

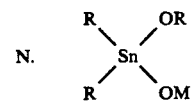

N.

-continued

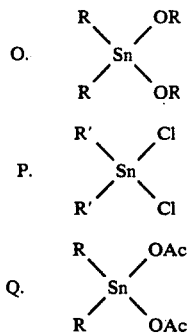

wherein M is an alkali metal, e.g. lithium, sodium, or potassium, M' is an alkaline earth metal such as Mg, Ca or Sr, each R represents an alkyl radical containing from 1 to 8 carbon atoms, each R' radical represents a substituent selected from those consisting of alkyl radicals containing from 1 to 8 carbon atoms (i.e. R radicals) and aryl radicals of the benzene series containing from 6 to 9 carbon atoms (e.g. phenyl, tolyl, benzyl, phenylethyl, etc., radicals), and Ac represents an acyl radical derived from an organic acid containing from 2 to 18 carbon atoms (e.g. acetyl, butyryl, lauroyl, benzoyl, stearoyl, etc.).

The novel bimetallic alkoxide catalysts can be made as described by Meerwein, Ann. 476, 113 (1929). As shown by Meerwein, these catalysts are not merely mixtures of the two metallic alkoxides. They are definite compounds having a salt-like structure. These are the compounds depicted above by the Formulas A through H. Those not specifically described by Meerwein can be prepared by procedures analogous to the working examples and methods set forth by Meerwein.

The other tin compounds can also be made by various methods such as those described in the following literature:

For the preparation of diaryl tin dihalides (Formula P) see Ber. 62, 996 (1929); J. Am. Chem. Soc. 49, 1369 (1927). For the preparation of dialkyl tin dihalides (Formula P) see J. Am. Chem. Soc. 47, 2568 (1925); C.A. 41, 90 (1947). For the preparation of diaryl tin oxides (Formula M) see J. Am. Chem. Soc. 48, 1054 (1926). For the preparation of tetraaryl tin compounds (Formula K) see C.A. 32, 5387 (1938). For the preparation of tin alkoxides (Formula J) see C.A. 24, 586 (1930). For the preparation of alkyl tin salts (Formula Q) see C.A. 31, 4290. For the preparation of alkyl tin compounds (Formula K and L) see C.A. 35, 2470 (1941): C.A. 33, 5357 (1939). For the preparation of alkyl aryl tin (Formulas K and L) see C.A. 31, 4290 (1937): C.A. 38, 331 (1944). For the preparation of other tin compounds not covered by these citations see "Die Chemie der Metal-Organishen Verbindungen." by Krause and V. Grosse, published in Berlin, 1937, by Gebroder-Borntrager.

The tin alkoxides (Formulas I and J) and the bimetallic alkoxides (Formulas A through H) contain R substituents which can represent both straight chain and branched chain alkyl radicals, e.g. diethoxide, tetramethoxide, tetrabutoxide, tetra-tert-butoxide, tetrahexoxide, etc.

The alkyl derivatives (Formulas K and L) contain one or more alkyl radicals attached to a tin atom through a direct C-Sn linkage, e.g. dibutyl tin, dihexyl tin, tetra-butyl tin, tetraethyl tin, tetramethyl tin, dioctyl tin, etc. Two of the tetraalkyl radicals can be replaced with an oxygen atom to form compounds having Formula M, e.g. dimethyl tin oxide, diethyl tin oxide, dibutyl tin oxide, diheptyl tin oxide, etc.

Complexes can be formed by reacting dialkyl tin oxides with alkali metal alkoxides in an alcohol solution to form compounds having Formula N, which compounds are especially useful catalysts, e.g. react dibutyl tin oxide with sodium ethoxide, etc. This formula is intended to represent the reaction products described. Tin compounds containing alkyl and alkoxy radicals are also useful catalysts (see Formula O), e.g. diethyl tin diethoxide, dibutyl tin dibutoxide, dihexyl tin dimethoxide, etc.

Salts derived from dialkyl tin oxides reacted with carboxylic acids or hydrochloric acid are also of particular value as catalysts; see Formulas P and Q. Examples of these catalytic condensing agents include dibutyl tin diacetate, diethyl tin dibutyrate, dibutyl tin dilauroate, dimethyl tin dibenzoate, dibutyl tin dichloride, diethyl tin dichloride, dioctyl tin dichloride, dihexyl tin distearate, etc.

The tin compounds having Formulas K, L and M can be prepared wherein one or more of the R' radicals represents an aryl radical of the benzene series, e.g. phenyl, tolyl, benzyl, etc. Examples include diphenyl tin, tetraphenyl tin, diphenyl dibutyl tin, ditolyl diethyl tin, diphenyl tin oxide, dibenzyl tin, tetrabenzyl tin, di($\beta$-phenylethyl) tin oxide, dibenzyl tin oxide, etc.

The tin catalysts can, in general, be employed for the preparation of substantially all polyesters involving an ester interchange reaction between a dicarboxylic acid or dicarboxylic acid ester and a glycol or glycol ester. The catalysts are especially valuable for the preparation of polyesters that melt above about 240° C.

Processes for preparing polyesters using tin-based catalysts are well known and described in the aforementioned U.S. Pat. No. 2,720,507.

The polyester in general may be prepared by condensing the dicarboxylic acid or dicarboxylic acid ester with the glycol in the presence of the tin catalyst described herein at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference. Generally, the tin compound catalyst is used in amounts of from about 0.005% to about 0.2% based on the weight of the dicarboxylic acid or dicarboxylic acid ester. Generally, less than about 700 ppm elemental tin based on polyester weight should be present as residue in the polyester.

The polycarbonate portion of the blend consists of the polycarbonate of 4,4'-isopropylidenediphenol (bisphenol A). The polycarbonate portion of the blends is prepared in the melt, in solution, or by interfacial polymerization techniques well known in the art.

Many such polycarbonates are commercially available, and are normally made by reacting bisphenol A with phosgene, dibutyl carbonate, diphenyl carbonate, etc. Conventional additives such as pigments, dyes, stabilizers, plasticizers, etc. may be used in tin polyester, polycarbonates and blends according to this invention.

The inherent viscosity of the polyester portion of the blends is at least 0.3 but preferably 0.6 or more. The inherent viscosity of the bisphenol A polycarbonate portion of the blends is at least 0.3 but preferably 0.5 or more.

The polyester/polycarbonate blends may be made by conventional techniques. Pellets of the polyester may be mixed with pellets of the polycarbonate and subsequently melt blended to form a homogeneous mixture.

The following examples are submitted for a better understanding of the invention.

The inherent viscosities of the polyesters are determined in 60/40 (wt/wt) phenol/tetrachloroethane at a concentration of 0.5 g/100 ml. Since the polycarbonate is degraded by this solvent system, the inherent viscosities of bisphenol A polycarbonate and the polyester/polycarbonate blends are determined in 25/35/40 wt/wt/wt phenol/tetrachloroethane/p-chlorophenol at a concentration of 0.1 g/100 ml.

The polyesters and polycarbonates are ground to pass a 3-mm screen, dry-blended, dried at 80°-110° C. overnight in a vacuum oven, and extruded and pelletized at 260°-300° C. on a ⅜-inch Brabender extruder equipped with a screen pack and mixing screw.

The color of the amorphous polymer pellets is determined in conventional manner using a Gardner XL-23 Tristimulus Colorimeter manufactured by Gardner Laboratory, Inc., Bethesda, Maryland. The colorimeter is calibrated by placing the glass plate support and the glass plate accessory in the sample port. The glass plate is covered with the white standard plate (#R850283) for 45°, 0° color and reflectance. The colorimeter is calibrated in the Rdab mode with the beam modifier control set in the large position to Rd=86.9, a=−1.3, and b=+2.1. The white standard plate, the glass plate, and the glass plate support are removed from the sample port. The glass cup support is placed in the sample port and the 2⅜-inch diameter by 1⅜-inch high sample cup is filled approximately three-fourths full of polymer pellets, set in the sample measurement port of the colorimeter, and covered with a Black Cavity accessory. The color difference meter (CDM) b color and a color values are then determined.

EXAMPLE 1

The following example illustrates the preparation of a polyester consisting of units from 83 mol % terephthalic acid, 17 mol % isophthalic acid, and 100 mol % 1,4-cyclohexanedimethanol (70% trans/30% cis) using dibutyltin diacetate as catalyst and preparation of a 50/50 blend of this polyester with Lexan 303 polycarbonate.

A mixture of 144.9 g (0.747 mol) dimethyl terephthalate, 29.7 g (0.153 mol) dimethyl isophthalate, 222.2 g (1.08 mol) 70% 1,4-cyclohexanedimethanol in methanol and 1.09 g dibutyl tin diacetate (~150 ppm Sn) is placed in a one-liter flask equipped with an inlet for nitrogen, a metal stirrer and a short distillation column. The flask is lowered gradually into a Wood's metal bath heated at 180° C. to allow the excess methanol to distill and heated for about 30 minutes. The temperature is raised to 220° C. for 30 to 40 minutes and then to 280° C. for about 30 minutes. Finally, the temperature is raised to 300° C. and a vacuum of 0.5 mm is gradually applied. Full vacuum is maintained for about an hour. The reaction is stopped to give a white, crystalline polymer with an I.V. of 0.70

The polyester is ground to pass a 3-mm screen and dry blended with an equal weight of ground Lexan 303 polycarbonate. The 50/50 blend is dried and then extruded and pelletized at 285° C. The clear, almost colorless pellets from the blend have a CDM b color value of +3.4, a CDM a color of −1.9, and an I.V. of 0.75.

EXAMPLE 2 (CONTROL)

A 50/50 blend having the same composition as Example 1, except that Kodar A150 polyester, a polyester of 83 mol % terephthalic acid, 17 mol % isophthalic acid, and 100 mol % 1,4 cyclohexanedimethanol (70% trans/30% cis), containing 82 ppm titanium residue is substituted for the polyester of Example 1. The blend is prepared using the procedures of Example 1. The red-orange pellets have a CDM b color value of +21.0, a CDM a color of +10.3, and an I.V. of 0.79.

The polyesters used in the following examples are prepared using procedures similar to those of Example 1.

EXAMPLE 3 (CONTROL)

The following example illustrates a blend of a polyester consisting of units from 100 mol % terephthalic acid and 100 mol % 1,4-cyclohexanedimethanol (70% trans/30% cis) with Lexan 303 polycarbonate.

The polyester containing 83 ppm titanium residue from catalyst is dry blended with an equal weight of Lexan 303 polycarbonate, extruded, and pelletized at 300° C. The red-orange pellets have a CDM b color of 20.1, a CDM a color of +4.2, and an I.V. of 0.83.

EXAMPLE 4

A polyester having the same composition as Example 3 is prepared using dibutyltin diacetate as catalyst. A blend of the polyester with Lexan 303 polycarbonate is prepared in the same manner as Example 3. The almost colorless, pale yellow pellets have a CDM b color value of 3.8, a CDM a color of −0.8, and an I.V. of 0.71.

EXAMPLE 5 (CONTROL)

A polyester having the same composition as Example 1 is prepared using tin as dibutyltin diacetate. The yellowness of the polyester has increased. A blend of this polyester and Merlon M-40 polycarbonate is prepared as in Example 1. The pellets have a yellow tint but are not red-orange and have a CDM b color value of 9.8, a CDM a color of −1.5, and an I.V. of 0.66.

The remaining examples in Table 1 are prepared using the procedures described in Examples 1-5.

Polyester compositions are defined as follows:

Composition A
  83 mol % terephthalic acid
  17 mol % isophthalic acid
  100 mol % 1,4-cyclohexanedimethanol Composition B
  100 mol % terephthalic acid
  100 mol % 1,4-cyclohexanedimethanol Composition C
  100 mol % terephthalic acid
  100 mol % 1,4-butanediol Composition D
  60 mol % terephthalic acid
  40 mol % trans-4,4'-stilbenedicarboxylic acid
  100 mol % 1,4-cyclohexanedimethanol Composition E
  100 mol % trans-1,4-cyclohexanedicarboxylic acid
  100 mol % 1,4-cyclohexanedimethanol

TABLE 1

Bisphenol A Polycarbonate/Polyester Blends

| Polycarbonate[a] | | Polyester | | | PC/PE Blends | | | | Example No. |
|---|---|---|---|---|---|---|---|---|---|
| | I.V. | Composition | I.V. | Catalyst, ppm[b] | Ratio[c], wt/wt | I.V. | CDM b Color[d] | CDM a Color | |
| Lexan 303 | 0.65 | — | — | — | 100/0 | — | −4.7 | +0.95 | — |
| Merlon M-40 | 0.57 | — | — | — | 100/0 | — | +2.6 | −1.70 | — |
| Lexan 303 | 0.65 | A | 0.69 | 142 Sn | 98/2 | 0.79 | +4.3 | −1.20 | — |
| Lexan 303 | 0.65 | A | 0.79 | 82 Ti | 50/50 | 0.84 | +21.0 | +10.3 | 2 |
| Lexan 303 | 0.65 | A | 0.71 | 99 Sn | 50/50 | 0.68 | +2.2 | −0.2 | — |
| Lexan 303 | 0.65 | A | 0.70 | 140 Sn | 50/50 | 0.75 | +3.4 | −1.9 | 1 |
| Merlon M-40 | 0.57 | A | 0.66 | 132 Sn | 50/50 | 0.77 | +5.5 | −1.6 | — |
| Merlon M-40 | 0.57 | A | 0.73 | 190 Sn | 50/50 | 0.73 | +5.6 | −1.7 | — |
| Merlon M-40 | 0.57 | A | 0.74 | 289 Sn | 50/50 | 0.74 | +6.5 | −1.5 | — |
| Merlon M-40 | 0.57 | A | 0.68 | 442 Sn | 50/50 | 0.66 | +9.8 | −1.5 | 5 |
| Merlon M-40 | 0.57 | A | 0.73 | 142 Sn | 30/70 | 0.87 | +4.8 | −1.3 | — |
| Merlon M-40 | 0.57 | A | 0.70 | 138 Sn | 20/80 | 0.62 | +2.8 | −0.5 | — |
| Merlon M-40 | 0.57 | A | 0.63 | 140 Sn | 2/98 | — | +2.8 | +0.8 | — |
| Lexan 303 | 0.65 | B | 0.76 | 83 Ti | 50/50 | 0.83 | +20.1 | +4.2 | 3 |
| Lexan 303 | 0.65 | B | 0.71 | 140 Sn | 50/50 | 0.71 | +3.8 | −0.8 | 4 |
| Lexan 303 | 0.65 | C | 1.03 | 100 Ti | 50/50 | 1.07 | +21.3 | +8.6 | — |
| Lexan 303 | 0.65 | C | 1.25 | 140 Sn | 50/50 | 1.15 | +3.7 | +0.8 | — |
| Lexan 303 | 0.65 | D | 0.79 | 100 Ti | 50/50 | 0.92 | +19.6 | +11.5 | — |
| Lexan 303 | 0.65 | D | 0.80 | 200 Sn | 50/50 | 0.89 | +2.5 | −1.3 | — |
| Merlon M-40 | 0.57 | E | 0.78 | 140 Sn | 50/50 | 0.63 | +5.6 | −1.7 | — |

[a]Lexan 303 (General Electric) and Merlon M-40 (Mobay) are polycarbonates of bisphenol A and phosgene.
[b]Catalyst levels are determined by X-ray fluorescence and are in units of parts per million.
[c]PC = polycarbonate, PE = polyester
[d]CDM b and a color value is determined using a Gardner XL-23 Tristimulus colorimeter.

EXAMPLE 6

A copolyester having the same composition as the copolyester of Example 1 is prepared using 1.09 g dibutyltin diacetate (∼150 ppm Sn) and 0.15 g zinc acetate (∼65 ppm Zn) as catalysts. A 50/50 wt/wt polycarbonate/polyester blend is prepared using this copolyester and Merlon M-40 polycarbonate as in Example 1. The polymer pellets have a CDM b color value of +6.1, and a CDM a value of −1.5.

EXAMPLE 7

B. A copolyester having the same composition as the copolyester of Example 1 is prepared using 1.09 g dibutyltin diacetate (∼150 g Sn) and 0.27 g manganese diacetate (∼55 ppm Mn) as catalysts. A 50/50 wt/wt polycarbonate/polyester blend is prepared using this copolyester and Merlon M-40 polycarbonate as in Example 1. The polymer pellets have a CDM b color value of +15.2, and a CDM a value of +0.1.

EXAMPLE 8

A copolyester having the same composition as the copolyester of Example 1 is prepared using 0.51 g dibutyltin diacetate (∼700 ppm Sn) as catalyst. A 50/50 wt/wt polycarbonate/polyester blend is prepared using this copolyester and Merlon M-40 polycarbonate as in Example 1. The polymer pellets have a CDM b color value of +8.3, and a CDM a value of −1.7.

EXAMPLE 9

A copolyester having the same composition as the copolyester of Example 1 is prepared using 0.51 g dibutyltin diacetate (∼700 ppm Sn) and 0.15 g Zonyl A (∼50 ppm P) as catalysts. A 50/50 wt/wt polycarbonate/polyester blend is prepared using this copolyester and Merlon M-40 polycarbonate as in Example 1. The polymer pellets have a CDM b color value of +6.4, and a CDM a value of −2.2.

EXAMPLE 10

A copolyester having the same composition as the copolyester of Example 1 is prepared using 0.51 g dibutyltin diacetate (∼700 ppm Sn) and 0.30 g Zonyl A (∼100 ppm P) as catalysts. A 50/50 wt/wt polycarbonate/polyester blend is prepared using this copolyester and Merlon M-40 polycarbonate as in Example 1. The polymer pellets have a CDM b color value of 14.3, and a CDM b value of −3.0.

EXAMPLE 11

A copolyester having the same composition as the copolyester of Example 1 is prepared using 0.73 g dibutyltin diacetate (∼1000 ppm Sn) as catalyst. A 50/50 wt/wt polycarbonate/polyester blend is prepared using this copolyester and Merlon M-40 polycarbonate as in Example 1. The polymer pellets have a CDM b color value of 10.3, and a CDM a value of −3.0.

The following Table 2 summarizes the results of Examples 6–11.

TABLE 2

| Polycarbonate | | Polyesters | | | PC/PE Blends | | | | Example No. |
|---|---|---|---|---|---|---|---|---|---|
| | I.V. | Composition | I.V. | Catalyst, ppm | Ratio, Wt/Wt | I.V. | CDM a Color | CDM b Color | |
| Merlon M-40 | 0.57 | A | 0.70 | 168 Sn, 63 Zn | 50/50 | 0.64 | −1.5 | +6.1 | 6 |
| Merlon M-40 | 0.57 | A | 0.68 | 132 Sn, 55 Mn | 50/50 | 0.67 | +0.1 | 15.2 | 7 |
| Merlon M-40 | 0.57 | A | 0.67 | 657 Sn | 50/50 | 0.61 | −1.7 | +8.3 | 8 |
| Merlon M-40 | 0.57 | A | 0.65 | 648 Sn, 47P | 50/50 | 0.65 | −2.2 | +6.4 | 9 |
| Merlon M-40 | 0.57 | A | 0.69 | 633 Sn, 87P | 50/50 | 0.62 | −3.0 | +10.3 | 10 |

TABLE 2-continued

| Polycarbonate | | Polyesters | | | PC/PE Blends | | | | Example No. |
| --- | --- | --- | --- | --- | --- | --- | --- | --- | --- |
| | I.V. | Composition | I.V. | Catalyst, ppm | Ratio, Wt/Wt | I.V. | CDM a Color | CDM b Color | |
| Merlon M-40 | 0.57 | A | 0.65 | 950 Sn | 50/50 | 0.60 | −3.0 | +14.3 | 11 |

Unless otherwise specified, all parts, ratios, percentages, etc., are by weight.

The invention has been described in detail with particular reference to preferred embodiments thereof, but it will be understood that variations and modifications can be effected within the spirit and scope of the invention.

I claim:

1. Composition of matter comprising a homogeneous blend of
   (a) about 5–95% by weight of a polyester consisting essentially of repeating units from an acid component of about 55–100 mol % terephthalic acid and about 45–0 mol % isophthalic acid, and a glycol component of 1,4-butanediol, 1,4-cyclohexanedimethanol or mixtures thereof, said polyester being the reaction product of said acid and said glycol produced in the presence of a catalyst comprising an organic derivative of tin and in the absence of titanium in the amount of about 0.005%–0.2% based on the weight of the acid component, and
   (b) about 95–5% by weight of a polycarbonate of 4,4′-isopropylidenediphenol,
   said composition having a Gardner b value of about 10 to about −1 and a Gardner a value of 4 to about −4.

2. Composition of matter according to claim 1 comprising about 20–80% by weight of said polyester and about 80–20% by weight of said polycarbonate.

3. Composition of matter according to claim 1 wherein said catalyst consists essentially of dibutyltin diacetate, dibutyltin oxide or mixtures thereof.

4. Composition of matter according to claim 1 characterized by having a Gardner b value of less than 6 and a Gardner a value of less than 4.

5. A composition of matter according to claim 1 wherein (a) is a polyester consisting essentially of repeating units from an acid component of about 83 mol % terephthalic acid and about 17 mol % isophthalic acid and a glycol component of 1,4-cyclohexanedimethanol.

6. A composition of matter according to claim 1 wherein (a) is a polyester consisting essentially of repeating units of terephthalic acid and 1,4-butanediol.

* * * * *